United States Patent
Hagenlocher (10) Patent No.: US 10,843,292 B2
(45) Date of Patent: Nov. 24, 2020

(54) INITIAL DISTANCE APPROACH FOR LASER PROCESSING

(71) Applicant: TRUMPF Laser—und Systemtechnik GmbH, Ditzingen (DE)

(72) Inventor: Tobias Hagenlocher, Ditzingen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 399 days.

(21) Appl. No.: 15/694,099

(22) Filed: Sep. 1, 2017

(65) Prior Publication Data
US 2017/0361400 A1    Dec. 21, 2017

Related U.S. Application Data

(63) Continuation of application No. PCT/EP2016/054218, filed on Feb. 29, 2016.

(30) Foreign Application Priority Data

Mar. 3, 2015  (DE) .................. 10 2015 103 047

(51) Int. Cl.
*B23K 26/04* (2014.01)
*B23K 26/08* (2014.01)
(Continued)

(52) U.S. Cl.
CPC ........ *B23K 26/048* (2013.01); *B23K 26/0342* (2015.10); *B23K 26/0853* (2013.01);
(Continued)

(58) Field of Classification Search
CPC .............. B23K 26/0342; B23K 26/048; B23K 26/0853; B23K 26/0884; B23K 26/21;
(Continued)

(56) References Cited

U.S. PATENT DOCUMENTS 6,353,203 B1   3/2002  Hokodate et al.
9,636,774 B2   5/2017  Mochida
(Continued)

FOREIGN PATENT DOCUMENTS

CN   103717343 A   4/2014
CN   103801826 A   5/2014
(Continued)

OTHER PUBLICATIONS

JP 05006211 A (Year: 1993).*
(Continued)

*Primary Examiner* — Tu B Hoang
*Assistant Examiner* — Tiffany T Tran
(74) *Attorney, Agent, or Firm* — Fish & Richardson P.C.

(57) ABSTRACT

In an example method, a laser processing head is moved from an entrance region over a workpiece to a starting position above the workpiece. During this time, a distance control system is used to control the distance between the laser processing head and the workpiece based on measurements obtained from one or more distance sensors. Further, the laser processing head is moved from the starting position to a position beyond an edge of the workpiece. During this time, the distance control system is disengaged. When the laser processing head reaches the position beyond an edge of the workpiece, laser emission is initiated, and the laser processing head is moved back towards the starting position. Upon reaching the starting position, the distance control system is reengaged. The laser processing head is subsequently moved along a pre-determined path to cut the workpiece.

13 Claims, 3 Drawing Sheets

(51) Int. Cl.
    *B23K 26/38*     (2014.01)
    *B23K 37/04*     (2006.01)
    *B23K 26/03*     (2006.01)
    *B23K 26/21*     (2014.01)
    *B23K 37/02*     (2006.01)
    *B23K 26/361*    (2014.01)

(52) U.S. Cl.
    CPC .......... *B23K 26/0884* (2013.01); *B23K 26/21* (2015.10); *B23K 26/361* (2015.10); *B23K 26/38* (2013.01); *B23K 37/0235* (2013.01); *B23K 37/04* (2013.01); *B23K 37/0461* (2013.01)

(58) Field of Classification Search
    CPC .. B23K 26/361; B23K 26/38; B23K 37/0235; B23K 37/04; B23K 37/0461; B23K 26/00; B23K 26/02; B23K 26/03; B23K 26/0844; B23K 26/0876; B23K 26/0892; B23K 26/08; B23K 26/352; B23K 37/0426; B23K 37/047; B23K 2101/36; G05B 2219/45139; G05B 2219/45041; G05B 2219/31077
    USPC ............ 219/121.83, 121.78, 121.79, 121.71, 219/121.67, 121.84; 700/166
    See application file for complete search history.

(56) References Cited

U.S. PATENT DOCUMENTS

2006/0081575 A1* 4/2006 Egawa .................. B23K 26/04
                                                   219/121.84
2009/0183612 A1  7/2009 Yamaguchi et al.
2013/0313235 A1* 11/2013 Wadehn ............... B23K 26/032
                                                   219/121.67
2014/0138363 A1* 5/2014 Hammann ........... B23K 26/048
                                                   219/121.78
2014/0312018 A1  10/2014 Leslie et al.

FOREIGN PATENT DOCUMENTS

| CN | 104002039 A | 8/2014 |
| CN | 104080570 A | 10/2014 |
| DE | 10 2010 039 528 | 2/2012 |
| DE | 10 2011 003395 | 3/2012 |
| DE | 10 2012 109 867 | 4/2013 |
| JP | 05-006211 A | 1/1993 |
| JP | H06297175 A | 10/1994 |
| JP | 2008-200712 A | 9/2008 |
| KR | 20100120383 A | 11/2010 |
| WO | WO 99/33603 A1 | 7/1999 |
| WO | WO 2012/104053 | 8/2012 |

OTHER PUBLICATIONS

International Search Report and Written Opinion in International Application No. PCT/EP2016/054218, dated Jun. 27, 2016, 18 pages (with English translation).
German National Examination Report in Application No. 102015103047.0, dated Nov. 2, 2015, 5 pages (English translation).
Office Action in Chinese Application No. 201680013724.7, dated Dec. 26, 2018, 11 pages (with English translation).
Korean Office Action in Korean Application No. 10-2017-7027682, dated Jul. 4, 2019, 12 pages (with English translation).

* cited by examiner

INITIAL DISTANCE APPROACH FOR LASER PROCESSING

CROSS-REFERENCE TO RELATED APPLICATIONS

This application is a continuation of and claims priority under 35 U.S.C. § 120 from PCT Application No. PCT/EP2016/054218 filed on Feb. 29, 2016, which claims priority from German Application No. 10 2015 103 047.0, filed on Mar. 3, 2015. The entire contents of each of these priority applications are incorporated herein by reference.

TECHNICAL FIELD

The present disclosure relates to a method of initial distance approach, for example, at laser cutting procedures, and in particular to a method for approaching a starting point of a separating cut, for example of a trimming cut. Furthermore, the disclosure relates to a laser processing system for performing those methods.

BACKGROUND

There are known processes, of which the position of a laser processing head with respect to the workpiece, while stationary, is measured as close as possible to the starting point of a laser cutting process and is afterwards adapted. The measurement will be considered by a successive positioning of the processing head at the laser turn-on point. Such a discontinuous positioning of the processing head can be time consuming.

Furthermore, WO 2012/104053 A1 discloses a process of separating a border section with a laser separating cut that is made from many individual cutting sections. The parameters of each starting point of the individual cutting sections are determined under inclusion of each previous cutting section.

SUMMARY

An efficient initial distance approach is particularly usable with hot forming-workpieces, which show one or more natural edge sections. Natural edges are particular edges which require no further processing due to a more exact keeping of a measure at a reshaping or deep drawing process or due to a constructional reason. Accordingly circumferential trimming cuts can be dispensed with in hot forming-workpieces. Instead, there are only individual edge sections of a contour to be processed with a locally limited trimming cut. As the starting point of such a contour section lies on the workpiece edge or the laser turn-on point is positioned outside of the workpiece, the sheet metal layer must be determined prior the cut. The more sections there are to be worked on, the more time will be needed for measuring and positioning at the starting point of the cutting processes.

The subject matter of the present disclosure covers efficiently approaching a starting position of a laser processing head for a laser processing procedure. In particular, in some aspects, the present disclosure covers methods for efficiently approaching the starting position of a laser processing head for a section-wise trimming cut. Generally, the implementations disclosed herein enable a laser processing head to quickly approach an actual position of the a workpiece, in particular by separating and trimming cuts, for a robust processing procedure.

In an aspect, a method for approaching a starting position, which is provided at a working distance from a surface of a workpiece, for laser processing with a laser processing head having a distance sensor system is disclosed, where the laser processing head should cause a contour cut of the workpiece, which starts at a workpiece edge of the workpiece. The method includes the following steps:

Providing position information relating to the starting position and space information relating to a predetermined entrance area, which at least partially extends at a distance to the surface of the workpiece, which is larger than the working distance, and which has a minimum distance from the starting position, the minimum distance allowing an adaptation of the distance of the laser processing head to the working distance during a movement of the laser processing head from the entrance area to the starting position;

Moving the laser processing head through the entrance area in direction of the starting position and activating a distance control, which is based on the distance sensor system, after entry of the laser processing head in the entrance area;

Continuing the moving of the laser processing head from the entrance area to the starting position, while adapting the distance of the laser processing head from the workpiece to the working distance by the distance control (wherein in particular the laser processing head passes the starting position at the working distance);

Continuing the moving of the laser processing head beyond the workpiece edge, wherein there are performed a deactivation of the distance control, which is based on the distance sensor system, and an activation of a distance freezing prior passing of the workpiece edge (wherein in particular the deactivation of the distance control, which is based on the distance sensor system, and the activation of a distance freezing is performed at the starting position), Turning on a laser emission from the laser processing head;

Moving the laser processing head back to the workpiece edge and above the workpiece in direction of the starting position; and Passing the starting position with the laser processing head at the working distance un-der laser emission, wherein there are performed a reactivation of the distance control, which is based on the distance sensor system, and a deactivation of the distance freezing prior the passing of the starting position or at the starting position.

In a further aspect, a machine tool includes a laser processing system with a laser system, a workpiece mount, and a laser processing head with a distance sensor system. The laser processing head is optically coupled to the laser system. Moreover, a relative movement between the laser processing head and the workpiece mount can be performed for performing a contour cut of the workpiece, the contour cut beginning at a workpiece edge of the workpiece. The machine tool includes further a control unit for performing a method for approaching of a starting position, which is provided at a working distance from a surface of a workpiece, for laser processing with the laser processing head according to the above method.

The concepts disclosed herein are based on the realization that a partial, e.g., section-wise, processing of the workpiece requires a robust, reproducible, and secure process for the "approaching" of the workpiece with the processing head. In particular, it is possible, according to these concepts, to detect a sheet-metal position with sufficient precision with respect to the position of the processing head "on-the-fly" (e.g., during a multi-dimensional movement of the processing head), in order to perform the trimming cut with the set process parameters.

The concepts disclosed herein can allow, when approaching a cut starting position, a metal sheet position to be recorded without stopping the machine axes, and therefore without stopping the processing head, for example by a capacitive distance sensor system. Thereby, when moving the processing head towards the starting position of the trimming cut, the actual position of the workpiece can be detected without stopping the main machine axes by capacitive distance sensing.

In some embodiments, a processing starting point with respect to the approximate workpiece position is defined, at which the processing head is passed by. For example, at the process starting point, a tolerance space sphere with, e.g., 2 mm radius is set up. When approaching the process starting point, with the entering of the main machine axes in this tolerance sphere, a dynamic distance axis, which initially is removed, is moved to the predetermined cutting distance synchronously with the movement to a point in the area of the start of the cut using a movement along the dynamic distance axis with help of the distance control. As the edge position of the workpiece is subject to tolerances, a movement set (e.g., a movement sequence) is performed towards the starting position of the trimming cut beyond the workpiece edge. Thereby, it is ensured that the trimming cut always reaches the workpiece edge and does not just begin within the workpiece. As the measuring device for the distance control is moved away from the workpiece, the distance control is frozen during the movement set, e.g., no synchronization of the main machine axes takes place based on the distance measurement result.

In comparison with discontinuous approaching concepts, the concepts disclosed herein save, for example, fractions of seconds for each approach of a trimming cut. For workpieces that are approached several times, the time saving can accordingly accumulate, so that, depending on the situation, several percent points of the processing time can be saved in comparison with the discontinuous approaching concepts. In this respect, the concepts disclosed herein relate in particular to the processing of workpieces which are subject to one or more trimming cuts that are to be carried out.

The concepts disclosed herein at least partially improve aspects of the state of the art. Particularly, further features and functions can be derived from the following description and from the drawings.

DETAILED DESCRIPTION

The aspects described herein are partially based on the realization that an integration of the process of distance taking in the course of movement, which proceeds a separation cut, can save valuable time. Moreover, it was realized that a suitable choice of the positions to be passed may further enable an accurate approaching of a starting position, even despite potential fluctuations in the dimensions of a workpiece within the frame of workpiece tolerances.

In the following, an exemplary machine tool based on a laser processing device is described in connection with FIG. 1, where the concepts disclosed herein with respect to the approaching of a control cut can be used. Thereafter, the movement of a processing head is illustrated with reference to the schematic illustrations of FIGS. 2 and 3 as well as to the flowchart of FIG. 4.

Figure 1:
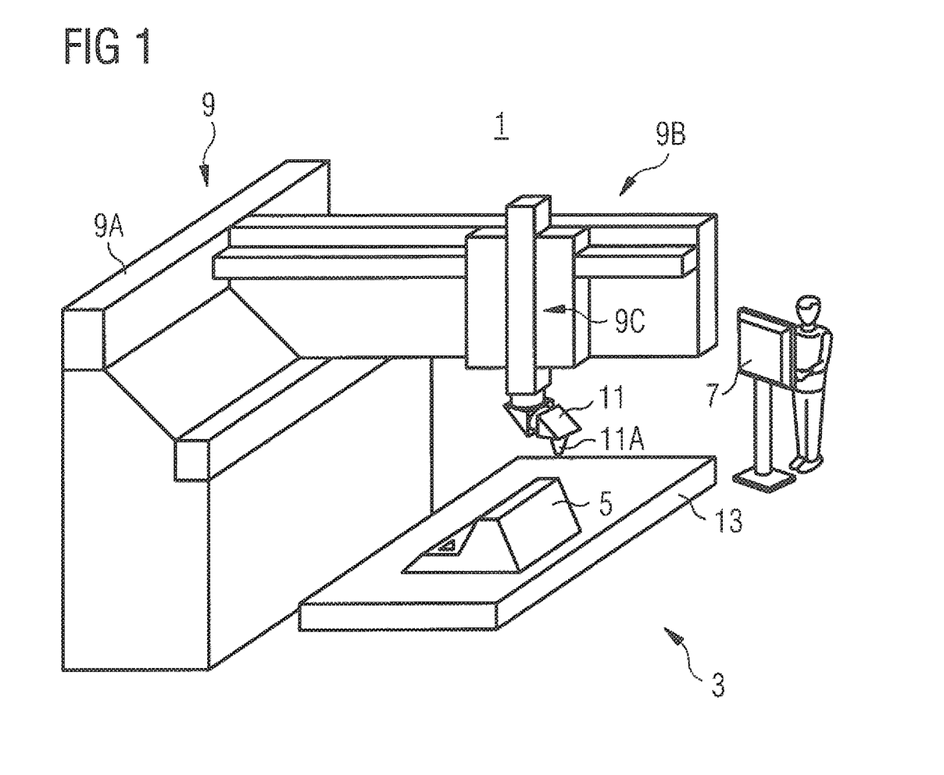
FIG. 1 is a schematic spatial illustration of a machine tool.

In FIG. 1, a machine tool 1 with a laser processing device 3 as a base machine for the processing of a workpiece 5 is illustrated. The operation of the machine tool 1 is done via an operating desk 7 of a control system (not explicitly shown). For example, by the creation and the setting of numerical control (NC) programs at the operating desk 7, the specific work procedures can be performed, which are adapted to workpieces and their processing. For example, the machine tool 1 includes a switch cabinet with the control system that is provided with a respective computer numerical control (CNC) controller, an electric supply of drives, as well as general logic and power parts.

A laser device (not explicitly shown in FIG. 1) of the laser processing device 3 serves for the generation of laser radiation and can, for example, be based on a solid-state laser such as a disk laser or fiber laser or be based on a gas laser such as a $CO_2$ laser. The beam guiding from the laser device to the workpiece can be performed by laser light cables and/or mirrors. Additional components of the machine tool 1 include, for example, a rotation changer for holding the workpiece 5 to be processed and for simple removal of processed workpieces, a compact dust collector for suction cleaning of smoke gases and airborne particles from the interior, a script conveyor, as well as elements for the pneumatics, for the supply of cutting gas and welding gas, as well as for the central lubrication.

A work course controlled by the CNC controller allows the processing of the workpiece 5 in a predetermined manner by interaction of various components of the laser processing device 3. Thereby, a work course can be performed repeatedly one after another and a large number of workpieces can be processed efficiently and essentially identically—despite potential variation in the sizes due to tolerance ranges.

A programmer creates the NC program for the respective production order within a programming system on a computer, for example, at the operating desk 7 of the control system. The control system can calculate the path of the laser automatically or with interaction with the user. The control system can define the sequence of processing, position initial cutting points at the correct locations, let sharp edges be rounded, or provide trimming cuts. Thereby, the control system can implement the strategies that the programmer selected specifically for a workpiece. In a preparing simulation, the programmer can see how the NC program as processed.

To ensure the quality of the cut, the NC program provides the control with the suitable values for operation parameters such as cutting speed, laser power, and nozzle distance. Those values are provided in so-called technology tables, which can be accessed by the control. Moreover, the processing parameters include workpiece-specific parameters such as tolerance limits of (e.g., sheet-metal) edges and maximally possible movement velocities of the processing head with respect to the workpiece and/or as well as the velocity of the distance setting.

In addition, FIG. 1 shows schematically the setup of the laser processing device 3, which is located, for example, within the interior of a protection cabin. The laser processing device 3 includes a movement unit 9 with components relevant to the function such as X-, Y-, and Z-carriages 9A, 9B, 9C for moving beam guiding and media supply components with respect to the workpiece 5.

Generally, the beam guiding components can include laser light cables, a Z-sleeve, collimation optics, and processing optics for guiding and focusing the laser beam onto the workpiece 5. The processing optics is usually provided within a processing head 11 with a nozzle 11A. The processing head 11 can be positioned and oriented essentially free in space, for example, by additional rotating and pivoting axes, and it can thereby guide the emitted laser beam in a controlled manner over the workpiece 5. Additional, in particular redundant, axes can improve a fast setting of the position and orientation of the processing head 11 with respect to the work-piece 5. The processing head 11—in the case of laser cutting also referred to as cutting head—transforms the laser beam by lens based or mirror based focusing optics to the cutting tool. The laser beam leaves the processing head 11 via the nozzle 11A, for example together with a cutting gas. The distance of the workpiece 5 can be in the range from 0.5 mm to 2 mm, for example, in the range from 0.7 mm to 1.2 mm.

In the exemplary embodiment of that movement unit, the processing head 11 can take every settable position and orientation within an area that is determined by the X-, Y-, and the Z-carriages 9A, 9B, 9C as well as by the mobility of the Z-sleeve. Drive units are associated with the X-, Y-, and Z-carriages 9A, 9B, 9C, which allow performing a relative movement of the processing head 11 with respect to the workpiece 5. The alignment of the processing head 11 with respect to the workpiece 5 is done by the rotating and pivoting axes. Based thereon, a workspace results that includes all points, which can be processed by the respectively focused emitted laser beam.

The workpiece 5 can be stationary positioned on a workpiece positioning device 13 by a clamp technique (not shown). In alternative embodiments, the workpiece 5 and/or the workpiece positioning device 13 are also movable in space. The concepts presented herein can be used in such configurations, when respectively adopted.

Additional elements such as clamps for clamping the workpiece 5 as well as sensors for recognizing a component and drives for guiding/moving the workpiece positioning device 13 belong usually to the workpiece positioning device 13.

Generally, reshaped sheet metal parts are an example of a three-dimensional, variably shaped workpiece 5. The workpiece 5 is, for example, a hot formed structural element for a vehicle, e.g., a B-pillar. Moreover, the workpiece can be configured, for example, also as a deep-draw component or as a plate, meaning that it can extend essentially in a plane. Similarly, also a pipe or a rod shaped workpiece is possible. Workpieces can be made of metal such as, e.g., steel, aluminum, or copper, or made of a metal alloy. Similarly, functional ceramics, plastics, organic materials, or other materials are also possible.

In exemplary cutting processes, a border area of the workpiece 5 can be post-processed by laser cutting with the laser beam, e.g., a so-called trimming cut as an example of a separating cut can be performed. To that effect, the processing head 11 is moved from the outside of the workpiece 5 in direction of the same with an activated laser beam, the cutting process can start when reaching the edge of the workpiece. The cutting edge should usually fulfill the predetermined quality requirements that can be achieved by maintaining predetermined processing parameters. For that purpose, the laser beam/the processing head 11 and the workpiece 5 are moved with respect to each other, so that a continuous gap can be generated in the workpiece along a processing track (e.g., a contour cut). Accordingly, the laser beam separates the workpiece 5 along the contour cut. Thereby, for example, border sections at natural edges of the workpiece 5 can be refined and/or the dimensions of the workpiece 5 can be adapted to desired values.

During the cutting, the distance between the cutting nozzle 11A and the workpiece 5 is to be controlled as exactly as possible to a desired value (herein also referred to as working distance), such that, continuously during the cut, the focus lies optimally with respect to the material surface and the cutting gas can flow optimally into the cutting gap. As already small deviations in distance can influence the result of the cut, the working distance, e.g., the distance be-tween the cutting nozzle 11A and the workpiece 5, is monitored usually by an active sensor system and is continuously readjusted. For that purpose, the sensor system measures generally the distance between the cutting nozzle 11A and the workpiece 5 in a continuous manner. For readjusting the distance along a so-called dynamic axis, the complete processing head 11 can, for example, follow or only its front part with, for example, objective and cutting nozzle 11A can be moved out and in. The working distance to be set can vary depending on the respective processing procedure and laser system. For example, melt cutting requires a smaller distance in the millimeter range in order to, for example, have the cutting gas flow into the cutting gap.

For a movement of the processing head 11 at a fixed distance with respect to the surface of the workpiece 5, the processing head 11 can, for example, include a distance sensor, the output signal of which is supplied to a distance control. The distance control is usually configured as a part of the control unit of the laser processing device 3. In some embodiments, the processing head 11 can be moved completely or at least partly along a dynamic axis which is specifically provided for the distance control, in order to continually ensure the required distance. If the distance control is activated accordingly, the processing head 11 moves in the predetermined working distance over the workpiece surface.

An exemplary distance control technology is, for example, disclosed in DE 10 2010 039 528 A1. For metallic materials, a sensor can measure the electric capacity between, for example, the sheet metal to be processed and the nozzle 11A. As the capacity changes when the gap between the sheet-metal and the nozzle increases or decreases, the sensor can derive therefrom the distance. If the distance does not agree with the programmed value, a control drives the cutting head again to the right height. Accordingly, by the distance control the cutting head has, as far as possible, always the optimal working distance to the workpiece.

Generally, deviations in the distance of the cutting nozzle 11A to the workpiece surface can be caused by the shape of the workpiece, deviations of the form in the range of the tolerance, and fluctuations in the movement of the processing head, and they can be compensated by such an integrated distance control.

A positioning and start of cutting process proceeds the main cutting process. The positioning and start of cutting process aims, inter alia, to ensure in a border range of the workpiece 5 (where, for example, due to process safety no distance control can be applied) the following: On the one hand, it is ensured that a trimming cut of the workpiece edge is achieved with sufficient quality up to a processing position, which is linked to a starting position of the processing head 11 and from which one can use the distance control. On the other hand, it is ensured that the processing head 11 can continue processing the workpiece 5 at a predetermined distance, for example, in a contour cut from the processing position, which is linked to a starting position (e.g, can be moved according to a predetermined processing path over the workpiece 5). Such a positioning and start of cutting process of the processing head 11 up to the starting position 27 is described in the following with reference to FIGS. 2 to 4.

Figure 2:
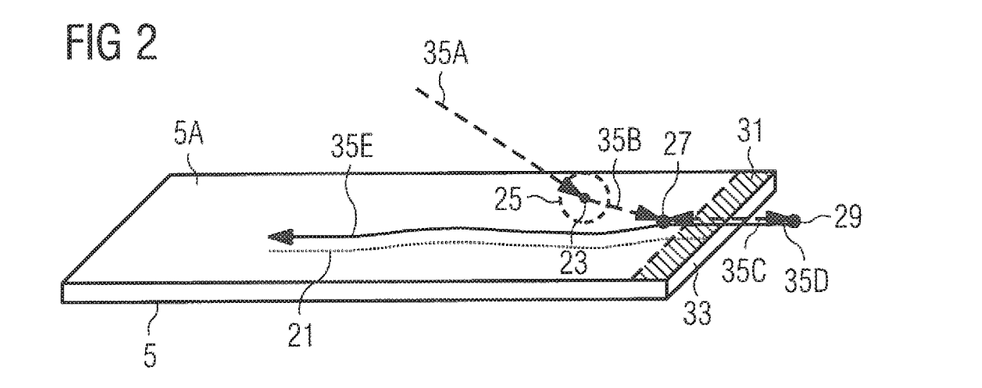
FIG. 2 is a schematic illustration of an approach path at the start of a separation cut.

FIG. 2 illustrates the course of movement of the processing head 11 during the positioning and extent of cutting process with respect to performing a contour cut. In FIG. 2, the respective course of the cut 21 is illustrated by a dotted line. The positioning of the processing head 11 includes, on one hand, courses of movement, during which the processing head 11 does not emit a laser beam and which are illustrated in FIG. 2 by dashed arrows. On the other hand, the start of cut process includes courses of movement, during which the laser beam emission is switched on and that is accordingly illustrated in FIG. 2 by solid line arrows.

In FIG. 2, one recognizes a workpiece 5, illustrated exemplary as a flat metal sheet. With respect to a surface 5A of the workpiece 5, three points are schematically drawn in FIG. 2: a reference point 23 exemplarily within an entrance area 25, a starting position 27 at working distance over the surface 5A of the workpiece 5, and a turnaround point 29.

The dimensions and configuration of a processing head 11 and the ideal distance between the workpiece 5 and the processing head 11 can differ greatly depending on the type of machine and the case of processing. An interaction zone, usually the focus point of the laser beam, is associated to each processing head, where the interaction action zone is located at a fixed distance along the laser beam axis in front of the cutting nozzle 11A. Thus, the optimal distance for the processing is reached when the interaction zone extends from the workpiece surface 5A into the workpiece 5.

The entrance area 25 shown in FIG. 2 extends as a sphere that has the reference point 23 as a center point and that has a predetermined diameter of, for example, between 1 mm and 10 mm, in particular between 2 mm and 5 mm. The reference point 23 is located, for example, over an assumed desired position of the workpiece surface 5A, which can deviate due to positioning and workpiece tolerances from the real position of the workpiece surface 5A. The entrance area 25 is selected such that it extends at least partially at a distance to surface 5A of the workpiece 5 and such that it can be approached by the processing head 11. Moreover, the starting position 27 is located above the real workpiece surface 5A. As an example, shown in FIG. 2, the starting position 27 is located outside a tolerance range 31 that extends along an edge 33 of the workpiece 5. Common tolerance ranges extend over, e.g., ±5 mm or smaller with respect to a desired course of the edge. In general, the starting position is located as close as possible to the edge 33, for example, at a distance in the range from 10 mm to 15 mm.

The location information with respect to the starting position 27 and the space information with respect to the predetermined entrance area 25 can be selected and inputted, for example, via the operating desk 5 of the control device when programming a NC program.

In particular, a space sphere around the reference point 23 as a center point is selected as entrance area 25, because thereby it can be ensured that the approaching corridor of the processing head 11 has always the same length independently from the preceding processing step, regardless from which direction the processing head 11 approaches.

FIG. 2 illustrates further the different segments of the movement of the processing head 11. A first segment 3 5A of the movement corresponds to an approaching of the processing head 11, until it enters the predetermined entrance area 25. After entering, the distance control is activated, which causes a movement for taking up the working distance, for example, along the dynamic axis. This movement of taking up the distance is superposed with the next segment 35B of the movement. Starting from the entrance area 25, thereby the processing head 11 moves along the section 35B of the movement to the starting position 27. The length of the section 35B of the movement and/or the velocity of the movement along the path of movement is set such that the distance of the processing head 11 from the surface 5A can be set to the working distance. With other words, machine parameters are usually taken into account when determining the distance between the entrance area 25 and the starting position 27, e.g., when selecting the space information with respect to the starting position 27 and the space information with respect to the predetermined entrance area 25.

In FIG. 2, one recognizes the approaching of the second section 35B of the movement to the workpiece 5. Accordingly, the laser processing head 11 passes the starting position 27 at the working distance. To enable the use of the distance control, the section 35B of the movement runs preferably continuously over the workpiece. Recesses and holes in the workpiece 5 are, for example, passed by, so that the distance control can be performed. If this cannot be ensured throughout, the distance control can be deactivated in those areas and one can move with frozen distance, thereby this accordingly contributed to the determination of the minimum distance.

Close to the edges, the distance control, which is based on the distance sensor system, can no longer be used due to the process safety. At starting point 27 (generally before the edge), the distance control is deactivated and a distance freezing is activated. e.g., the value for the dynamic axis is no longer controlled and maintained to be saved in the machine control with that value, which was taken at the starting point 27. Thereafter, the movement of the laser processing head 11 is continued to the workpiece edge 33 (e.g., without break). While this distance is frozen, the movement is done incrementally, e.g., the management of the movement relates to the last approached position of the processing head (e.g., at the start of freezing, the starting point 27) and not to the machine coordinate system. The path of movement extends within the segment 35C of the movement beyond the workpiece edge 33 up to the turnaround point 29. Accordingly, starting at that point in time, the processing head 11 moves without reaction to changes in the surface 5A of the workpiece 5. However, due to the closeness to the edge 33, it can be assumed that, along the segment 35C of the movement, no bigger variations exist in the surface 5A that could, for example, result in a damage of the nozzle 11A. Accordingly, in FIG. 2, the section 35C of the movement is indicated in a linear manner at constant distance to the surface 5A or to an extrapolation of the surface 5A of the workpiece 5.

The turnaround point 29 is, for example, selected such that the processing head 11 is no longer above the surface 5A of the workpiece 5, which is to be processed, even if the maximum tolerance regarding the dimension of the workpiece 5 is given, e.g., that the laser beam does not hit the surface 5A when being switched on.

In the section 35D of the movement, the processing head is moved back to the workpiece edge 33 and over the workpiece 5 in direction to the starting position 27. Thereby, a laser emission from the laser processing head 11 is turned on before passing the workpiece edge 33. As due to reasons of saving time, the processing head should only move beyond the workpiece 5 as far as needed for starting the laser in a reliable process, the turnaround point 29 corresponds to, for example, the switch-on point of the laser as shown in FIG. 2. As in the section 35C of the movement, a linear movement in direction of the starting position 27 takes place in the section 35D of the movement.

As soon as the laser beam hits workpiece 5, a cutting gap is formed. Due to a potentially not yet ideal alignment and/or distance situation of the processing head 11 within the section 35D of the movement, the quality of the cut can still be far from the optimal desired quality. As the saved distance value at the starting position 27 should, however, not deviate that much from the real component, the quality should still be sufficient. While passing the starting position 27, the distance regulation is again activated so that the processing head 11 follows the contour cut 21 starting at the starting position 27 (e.g., section 35E of the movement) at the desired working distance, so that in this area the cut can take place with the desired quality. Accordingly, when passing the starting position 27, a reactivating of the distance control, which is based on the distance sensor system, and a deactivating of the distance freezing is performed.

Figure 3:
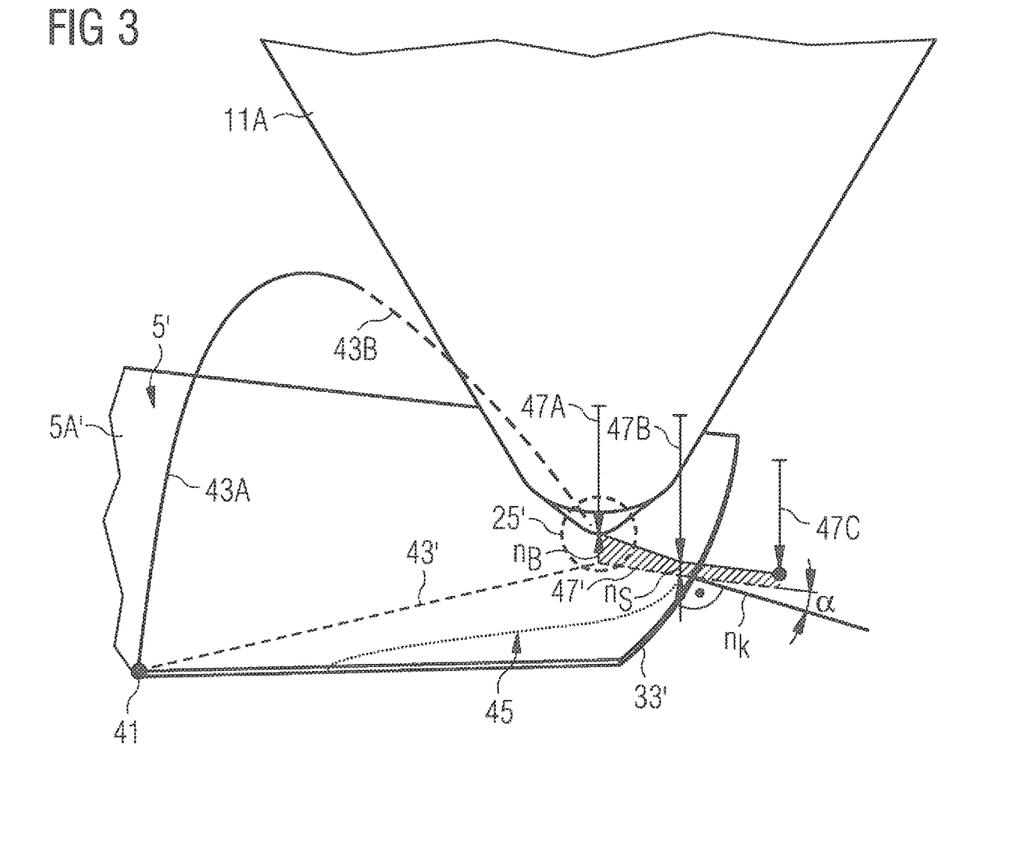
FIG. 3 is a schematic illustration of an approach process at the start of a trimming cut.

FIG. 3 illustrates the course of movement based on an exemplary workpiece processing of a trimming cut. In the three-dimensional illustration, one sees the nozzle 11A centrally over a workpiece 5'. The workpiece 5' has an edge contour, which is to be reworked and which should be corrected in its dimensions in a trimming cut.

For example, the nozzle 11A comes from a proceeding laser processing step that ended at an end point 41. Starting from the end point 41, the processing head is quickly moved away from the surface 5A' of the workpiece 5' for ensuring a conflict free movement. An exemplary course 43A of movement is illustrated in FIG. 3. From a highest point of the course 43A of the movement, the processing head is moved thereafter along the course 43A again closer to the work-piece 5', where an entrance area 25' is the target, the entrance area 25' being located, for example, near a later to be driven contour 45 of a trimming cut. In FIG. 3, a projection line 43' of the surface 5A' is indicated for illustration, which is associated to the courses 43A and 43B of movement.

In FIG. 3, a center point of a sphere is illustrated by an arrow 47A as an example of a space information of the predetermined entrance area 25'. Another example of a space information would be a dimension determining a volume such as a radius of a sphere. An NC program can contain the setting that the distance control is activated, for example, at the point in time of entering the entrance area 25' or at the reference point itself. Accordingly, when continuing the movement, the processing head is lowered in direction of the starting position, which is illustrated in FIG. 3 by an arrow 47B, to the optimal working distance with respect to the surface 5A' of the workpiece 5'.

For illustration, a projection line 47' on the surface 5A' (and beyond) is indicated in FIG. 3 that is associated to the courses of movement of the nozzle 11A from the center point of the sphere (arrow 47A) to the starting position (arrow 47B) and beyond over the edge 33' to a turnaround point (arrow 47C). One recognizes the decrease in distance (narrowing shaded area between the projection line 47' and the solid line illustrating the nozzle movement) as well as the course, which begins linear at the starting position, in accordance to an essentially constant, even if un-controlled, distance to the surface 5A' and its assumed extension.

From the starting position, the processing head is moved linearly in direction of the edge 33' and beyond, wherein the distance control is deactivated, for example, when passing the starting position 47B and the distance freezing is activated. At the turnaround point (or at least outside of the workpiece 5'), the laser emission is started without primarily being able to interact with the material of the workpiece 5'. After the turnaround of the movement, the processing head is moved again back to the starting position while maintaining the freezing of the distance. When passing the edge 33', the laser beam will make a cut that extends up to the starting position and from there follows the contour 45 of the trimming cut to be performed.

The position of the entrance area to a reference point, for example, of the starting position, is generally defined. The starting position lies, for example, outside of a tolerance range of the workpiece edge.

It has proven to be advantageous for the process safety and the time saving, when the laser processing head is aligned in particular at the starting point such that the laser propagation direction runs parallel to the normal $n_s$ of the workpiece surface 5' (e.g., in FIG. 3 illustrated as an arrow pointing against the arrow 47B) and the direction of movement of the laser processing head between the starting position (e.g., in FIG. 3 arrow 47B) and the turnaround point (e.g., in FIG. 3 arrow 47C) lies in a plane, which is set up orthogonally to the normal to the workpiece at the starting position (e.g., in FIG. 3 arrow 47B). If a flat workpiece 5' is assumed (as exemplarily shown in FIG. 3), the direction of movement lies in a plane parallel to the workpiece plane through the starting position.

In addition, it is advantageous, when the course of movement between the starting position and the turnaround point is oriented such that the associated projection line (47') with a normal $n_k$ to the course of the workpiece edge 33' shows an angle α at the intersection of the projection line 47' that lies between 0° and 45°, in particular between 0° and 25°. Thereby, the distance on the workpiece 5', which is covered without distance control, can be reduced and, in the ideal case, be minimized.

Figure 4:
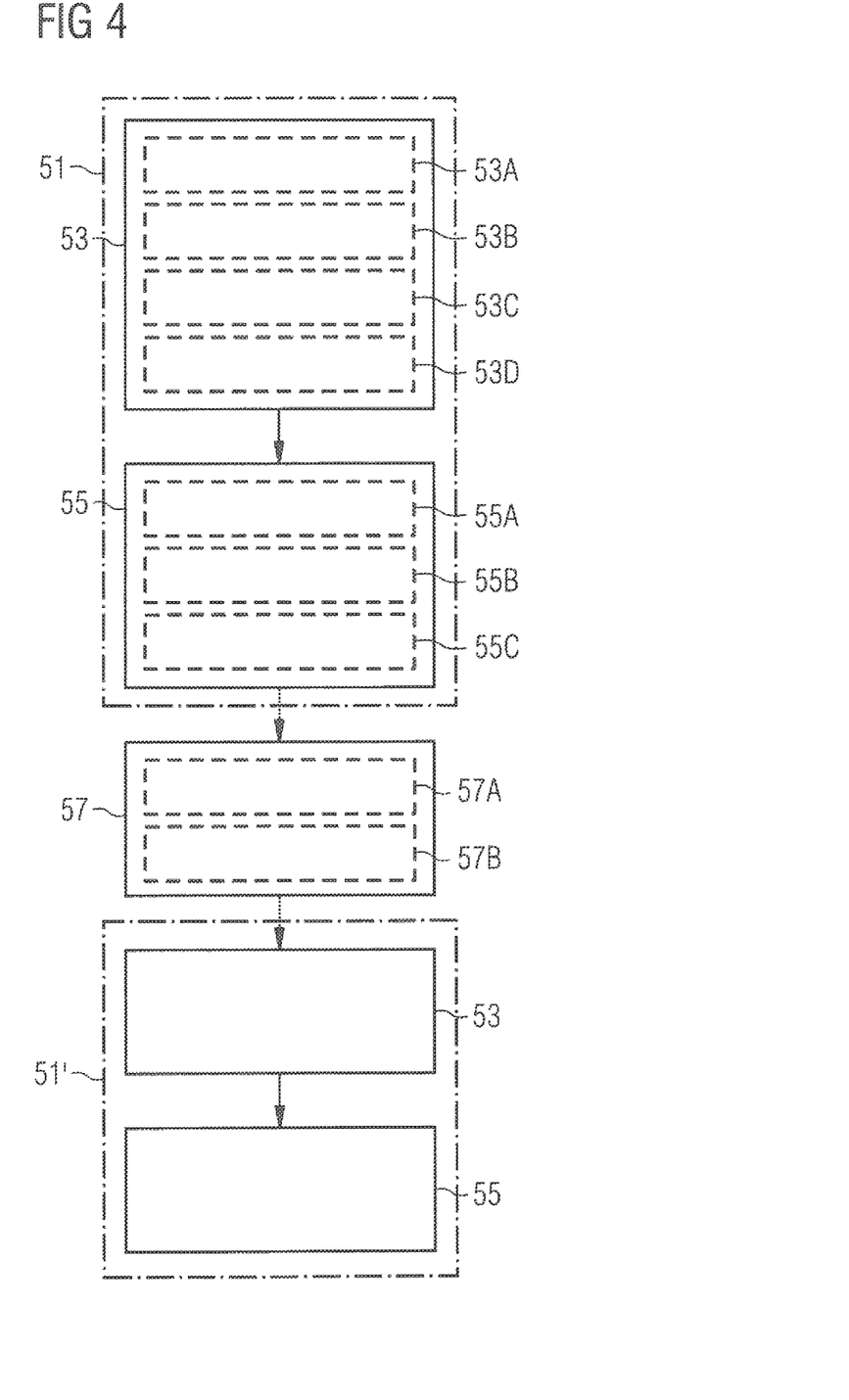
FIG. 4 is a schematic flowchart for illustrating an exemplary course when taking up the initial distance.

The flowchart of FIG. 4 illustrates the method for approaching a starting position for a laser processing with a laser processing head, where the starting position is provided at a working distance from a surface of a workpiece. For example, the laser processing head includes a distance sensor system and, during a subsequent processing, it should perform, for example, two contour cuts of the workpiece that begin close to a workpiece edge of the workpiece. FIG. 4 includes accordingly two essentially identical sections of 51, 51' in the flowchart, that can be defined within NC program for trimming cuts that are independent from each other.

Each of the sections 51, 51' includes a first laser emission-free section 53 and a second laser emitting section 55.

The basis for the first section 53 is that location information with respect to the starting position and space information with respect to the predetermined entrance area are provided in step 53A, such as read from a databank. In the subsequent step 53B, the laser processing head moves through the entrance area in direction to the center of the entrance area and further to the starting position, whereby a distance control is activated, e.g., after entering in the entrance area. The movement of the laser processing head is continued in step 53C from the entrance area to the starting position, thereby the distance of the laser processing head from the workpiece is adapted to the working distance by the distance control, so that the laser processing head passes the starting position at the working distance from the workpiece surface. Thereafter, the movement of the processing head is continued in step 53D with deactivated distance control, e.g., with frozen distance, to the workpiece edge and beyond.

After a predetermined passed distance from the workpiece, a turnaround of the direction of movement to the workpiece is caused, so that the processing head moves back to the workpiece edge in step 55A and continues the movement over the workpiece in direction of the starting position. Thereby, the laser emission is switched on prior to passing the workpieces edge. To complete the approach of the starting position, the starting position is passed with the laser processing head at the working distance under laser emission in step 55B. Thereby, the distance control is reactivated and the distance freezing is deactivated. In the subsequent step 55C, the creation of the separation cut is performed, for example, in the form of a contour cut of the workpiece up to an endpoint.

Between two trimming cuts, a new positioning of the processing head can be prepared in an intermediate section 57. For example, once the endpoint is reached, at first an increase of the distance to the workpiece can be done (step 57A), as described before in connection with FIG. 3, where the laser emission was switched off. Thereafter, the processing head is moved in the direction of a further entrance area (step 57B), so that the steps 53 and 55 can be performed anew for a further separating cut.

For a section-based processing, a respectively pre-positioning has to be repeatedly performed. This is illustrated in FIG. 4 by the repetition of sections 51, 51'.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

A number of embodiments have been described. Nevertheless, it will be understood that various modifications may be made without departing from the spirit and scope of the invention. Accordingly, other embodiments are within the scope of the following claims.

What is claimed is:

1. A method for approaching a starting position for laser processing a workpiece with a laser processing head having a distance sensor system, wherein the laser processing head is configured to perform a contour cut with respect to the workpiece starting from a workpiece edge of the workpiece, the method comprising:

providing position information relating to the starting position, wherein the starting position is provided at a working distance from a surface of the workpiece, and space information relating to a predetermined entrance area, wherein the predetermined entrance area at least partially extends at a distance to the surface of the workpiece, wherein the distance is larger than the working distance, wherein the predetermined entrance area is at a predetermined distance from the starting position, the predetermined distance allowing an adaptation of the distance of the laser processing head to the working distance during a movement of the laser processing head from the predetermined entrance area to the starting position;

moving the laser processing head through the predetermined entrance area in direction of the starting position and activating a distance control operation after entry of the laser processing head in the predetermined entrance area, wherein the distance control operation comprises measuring a distance of the laser to the surface of the workpiece using the distance sensor system and controlling the distance of the laser processing head to the surface of the workpiece;

continuing the moving of the laser processing head from the predetermined entrance area to the starting position, while adapting the distance of the laser processing head from the workpiece to the working distance by the distance control operation:

continuing the moving of the laser processing head beyond the workpiece edge and, prior to the laser processing head passing the workpiece edge, deactivating the distance control operation and freezing a set distance of the laser processing head by a distance freezing operation;

while the laser processing head is beyond the workpiece edge, turning on a laser emission from the laser processing head;

moving the laser processing head from beyond the workpiece edge back to the workpiece edge and above the workpiece in direction of the starting position; and passing the starting position with the laser processing head at the working distance under laser emission, and prior to the laser processing head passing the starting position or upon the laser processing head reaching the starting position, reactivating the distance control operation and deactivating the distance freezing of the laser processing head.

2. The method according to claim 1, wherein the distance control operation is deactivated or the distance freezing is activated at the starting position is performed upon the laser processing head reaching the starting position.

3. The method according to claim 1, wherein the laser processing head passes the starting position at the working distance.

4. The method according to claim 1, wherein the predetermined entrance area is defined as a volume or a spherical volume relative to the starting position.

5. The method according to claim 1, wherein the starting position is set outside of a tolerance range given for the workpiece edge.

6. The method according, to claim 1, wherein the predetermined entrance area is positioned between an endpoint of a preceding laser processing movement of the laser processing head and the starting position, and wherein the method further comprises moving the processing head starting from the endpoint along a trajectory such that the laser processing head is initially at a particular distance from the workpiece and is subsequently lowered from the particular distance in a direction of the predetermined entrance area.

7. The method according to claim 1, wherein the predetermined entrance area is positioned outside of a tolerance range of the workpiece edge.

8. The method according to claim 1, further comprising defining the predetermined entrance area and the starting position to be arranged with respect to the workpiece such that, along a stretch from the predetermined entrance area to the starting position, a usability of the distance control operation is ensured.

9. The method according to claim 1, wherein movement of the laser processing head between the starting position and the workpiece edge, and outside of the workpiece edge, is performed in increments.

10. The method according to claim 1, wherein after deactivation and before reactivation of the distance control operation, the movement is continued towards a turning point and back from the turning point linearly.

11. The method according to claim 10, wherein a movement direction of the laser processing head between the starting position and the turning point lies in a plane that spans orthogonally to the normal to the workpiece at the starting position.

12. The method according to claim 10, wherein a projection line relating to a movement segment between the starting position and the turning point, encompasses an angle on the workpiece surface with respect to a normal to the workpiece edge at an intersection of the projection line with the workpiece edge, wherein the angle is between 0° and 45°.

13. The method according to claim 1, wherein, at the starting point, the laser processing head is aligned such that a propagation direction of the laser of the laser processing head corresponds to a normal to the workpiece at the starting position.

* * * * *